(12) United States Patent
Keener (10) Patent No.: US 6,499,926 B2
(45) Date of Patent: Dec. 31, 2002

(54) FASTENER APPARATUS AND METHOD OF FASTENING NON-METALLIC STRUCTURES

(75) Inventor: Steven G. Keener, Rancho Santa Margarita, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/860,649

(22) Filed: May 18, 2001

(65) Prior Publication Data

US 2002/0172576 A1 Nov. 21, 2002

(51) Int. Cl.[7] .............................. F16B 19/06; F16B 21/14
(52) U.S. Cl. ...................... 411/504; 411/506; 411/513; 411/902
(58) Field of Search ................ 411/500, 501, 411/504, 506, 507, 901, 902, 903, 513

(56) References Cited

U.S. PATENT DOCUMENTS

| | | | |
|---|---|---|---|
| 2,511,920 A | 6/1950 | Keller et al. | |
| 3,030,850 A | 4/1962 | Minor et al. | |
| 3,642,312 A | * 2/1972 | Dalton | ............... 411/504 X |
| 4,447,944 A | 5/1984 | Mohrman | |
| 4,478,544 A | * 10/1984 | Strand | ............... 411/901 X |
| 4,817,264 A | 4/1989 | Worthing | |
| 4,985,979 A | 1/1991 | Speakman | |
| 5,018,920 A | 5/1991 | Speakman | |
| 5,120,175 A | 6/1992 | Arbegast et al. | |
| 5,498,110 A | 3/1996 | Stencel et al. | |
| 5,614,037 A | 3/1997 | Keener | |
| 5,634,751 A | 6/1997 | Stencel et al. | |
| 5,671,521 A | 9/1997 | Briles | |
| 5,680,690 A | 10/1997 | Briles et al. | |
| 5,858,133 A | 1/1999 | Keener | |
| 5,922,472 A | 7/1999 | Keener | |
| 5,944,918 A | 8/1999 | Keener | |

* cited by examiner

Primary Examiner—Neill Wilson
(74) Attorney, Agent, or Firm—Altson & Bird LLP (57) ABSTRACT

A fastener for fastening and joining sections of composite material together is disclosed comprising a substantially cylindrical core component and substantially cylindrical hollow sleeve component, one or both of which are precoated with a curable organic coating, and methods of fastening aircraft components together using such fasteners.

41 Claims, 5 Drawing Sheets

FASTENER APPARATUS AND METHOD OF FASTENING NON-METALLIC STRUCTURES

FIELD OF THE INVENTION

This invention relates generally to structural fasteners for joining various types of materials including composite materials. More specifically, the present invention relates to a pre-coated and sleeved deformable-shank fastener particularly suited for fastening aircraft structural components.

BACKGROUND OF THE INVENTION

In the aerospace industry today, the use of structural components made from composite materials has become increasingly widespread. The primary method of joining such materials together has been mechanical fastening. Although bonding technology is known and continues to be developed, mechanical joining continues to be the preferred assembly method for structural load-carrying joints, such as the metallic structural components of an aircraft.

When connecting structural aircraft components made from composite materials, great care must be taken not to damage the composite. At the present time, deformable-shank metallic fasteners, such as rivets, are not used to join composite components. This is because during rivet installation and assembly, each end of the rivet is compressed causing outward expansion of the rivet. Such expansion can damage composite sections and result in material fatigue. Therefore, the typical rivet installation and assembly method used, for example, in assembling aluminum aircraft components, will not work with composite structures due to the risk of composite damage caused during rivet installation.

The use of a collar or sleeve surrounding a nut and bolt assembly is known in the fastener field. However, such collars have not been practical in the field due either to the resulting poor fit or the damage caused to the composite material being joined. Further, conventional two-piece fasteners are more expensive to use and are time-consuming to install.

Further, the use of a sleeve, in combination with a rivet, until now, has created more problems in the field than it has solved. Any gaps that occur due to the non-uniform expansion of the sleeve positioned in the hole, or in the rivet within the sleeve can result in a condition known as "gapping." "Gapping" refers to the creation of gaps, causing discontinuities in the structural assembly. Under high stress forces, gapping can lead to "fretting", or improper load transfer in the assembled joint, seriously affecting the integrity of the assembly and promoting fatigue. Also, moisture or other residue can collect in the gaps allowing electrical arcing to occur. This can cause, in extreme situations, small explosions that lead to material weakness in the joint resulting in a condition in which the rivet can no longer provide the intended joint integrity. As a result of these and other drawbacks in the current fastener technology, a simple and reliable installation method for metallic fasteners used in fastening or joining composite sections or components is not known.

SUMMARY OF THE INVENTION

The present invention relates to fasteners for joining a plurality of components together. In one embodiment, the present invention relates to a fastener for fastening sections of composite material together. The fastener comprises two components. The first component is a sleeve segment that is substantially cylindrical having a predetermined diameter and length. The second component is an core component, preferably solid and coated with a curable organic coating. The core component fits within the substantially cylindrical sleeve component. The sleeve component has an inner diameter slightly greater than the diameter of the core segment. The sleeve component preferably has a length that is less than the length of the core component, and has a wall thickness of from about 0.006 inch to about 0.020 inch.

In a further embodiment, the present invention relates to a fastener for fastening sections of composite material together, wherein the fastener comprises a substantially cylindrical core and a substantially cylindrical sleeve component, one or both of which are coated with a curable organic coating.

In still a further embodiment, the present invention relates to a method for fastening aircraft components together. A plurality of composite aircraft components is provided with each component having a cylindrical opening. The cylindrical openings in the component sections are aligned, and the fastener of the present invention is inserted into the component section openings. The fastener comprises a substantially cylindrical sleeve component, and a substantially cylindrical core component designed to fit within the substantially cylindrical sleeve. The substantially cylindrical core preferably is coated with a phenolic resin containing coating. Pressure is applied to the cylindrical core component deforming the core component and causing the deformed core component to exert substantially uniform radial outward force on the cylindrical sleeve. The sleeve is then deformed in substantially uniform radially outward directions to positively secure the composite sections.

Still further, an embodiment of the present invention is directed to aircraft comprising composite parts held together with two-component fasteners that comprise a coated core component that fits within a sleeve component. One or both of the core and sleeve components preferably are coated with a curable organic coating.

BRIEF DESCRIPTION OF THE DRAWINGS

FIG. 1b shows a perspective view of the assembled fastener of FIG. 1a.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
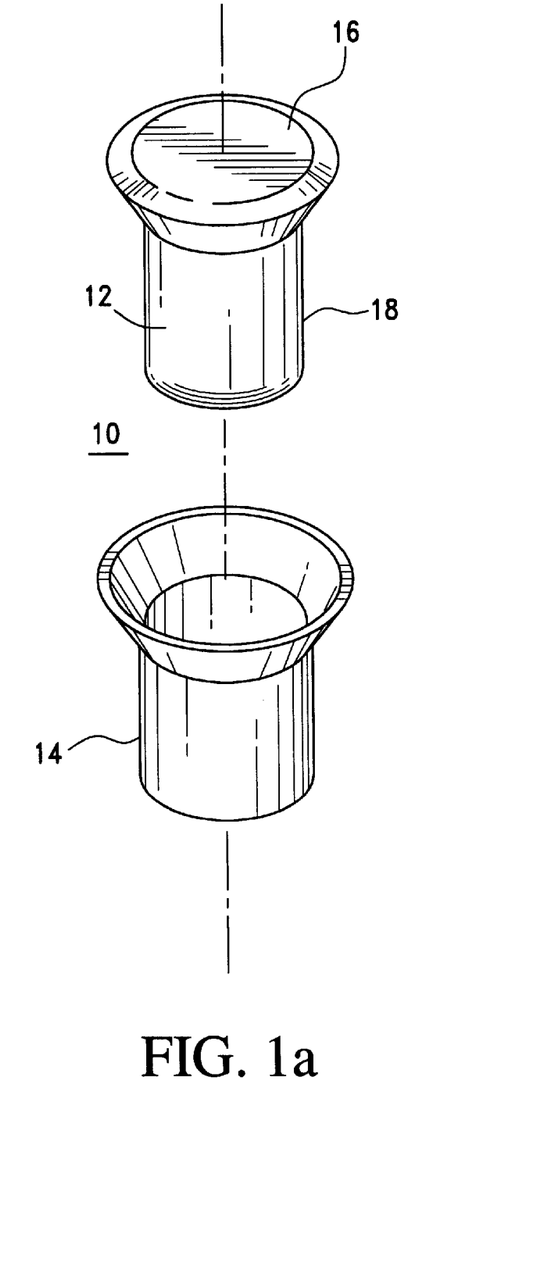
FIG. 1a shows an exploded view of the two-component fastener of the present invention.
Figure 1B:
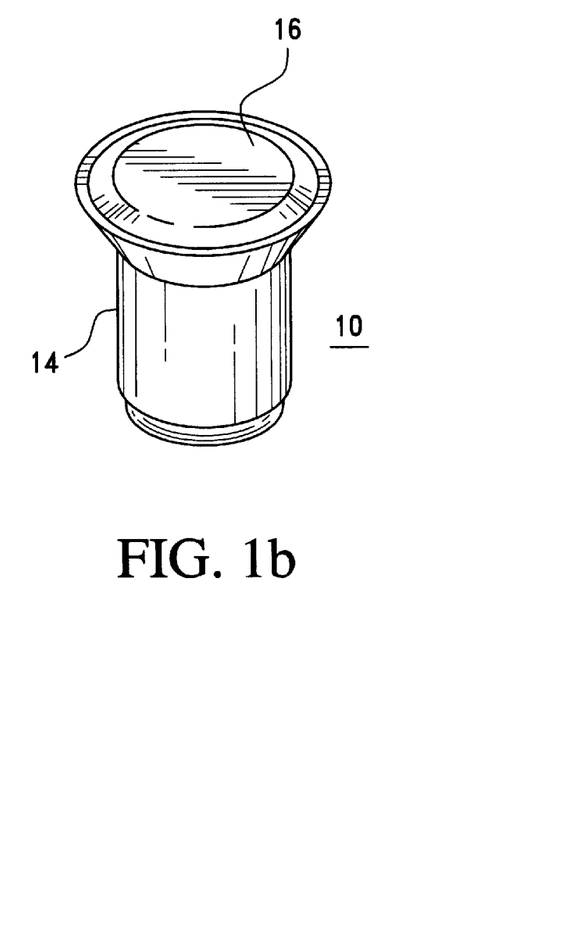
Figure 2A:
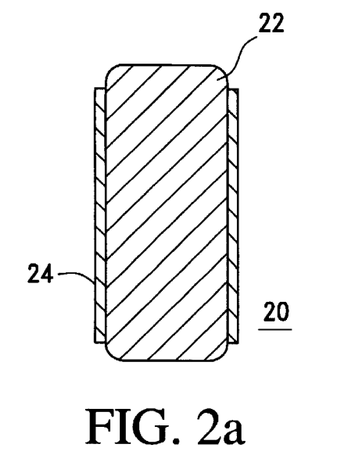
FIG. 2a shows an alternate embodiment of the present invention including a headless slug.
Figure 2B:
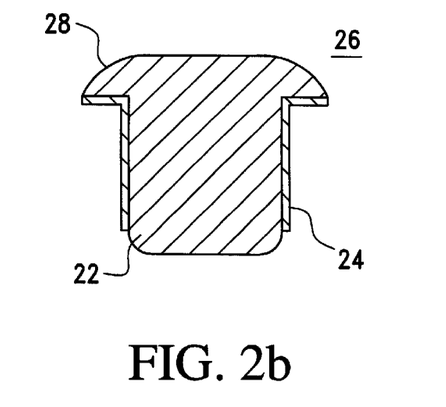
FIG. 2b shows an alternate embodiment of the present invention including a protruding head.
Figure 3:
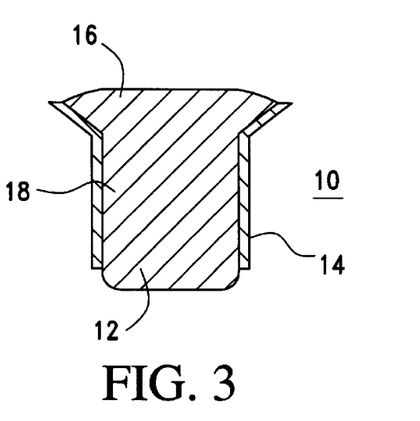
FIG. 3 shows a cross-sectional view of the two-component fastener of FIG. 1b.

FIG. 1a shows a perspective view of one preferred embodiment of the present invention. FIG. 1b shows the two piece fastener shown in FIG. 1a, in an assembled state. A sleeved fastener 10 comprises a solid core component 12 and a sleeve component 14. The core 12 has a head portion 16 and a body portion 18. The body portion 18 is substantially cylindrical, and the head portion 16 may, as shown, extend outwardly from the body at any desired angle. FIGS. 2a and 2b are directed to two preferred embodiments of the present invention: one is a flush, pre-manufactured "head" 26 and the other is a slug version that is "headless" 20. FIG. 3 shows the fastener 10 of FIG. 1b in a cross-sectional view.

FIG. 2a shows a cross-sectional view of a preferred embodiment of the present invention in the slug configuration. A sleeved fastener 20 comprises a headless slug core component 22 held within a sleeve component 24. FIG. 2b shows another embodiment of the sleeved fastener of FIG. 1b. In this figure it is understood that the fastener is not shown fastening anything together. In this configuration, the "head" 22 is pre-manufactured and contains a head segment 28.

Figure 4A:
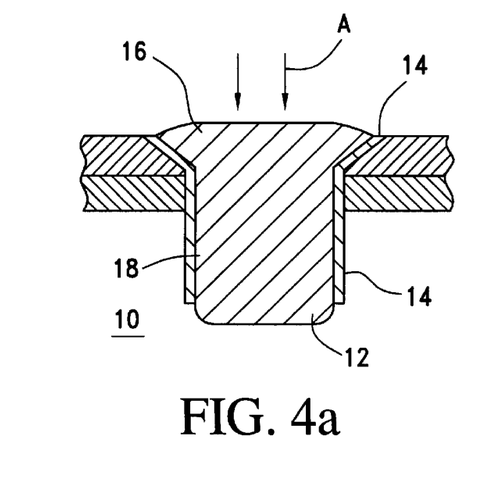
FIGS. 4a and 4b show the fastener of FIG. 1b in the installed position before and after installation.
Figure 4B:
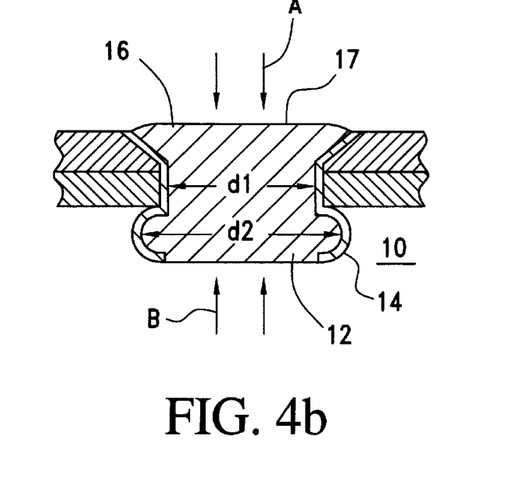

FIG. 4a shows a cross-sectional view of the fastener 10 of FIG. 3 after being inserted, or mechanically "driven" with force in the direction of Arrow A. The undriven core 12 comprises a head portion 16 and a body portion 18. The body portion 18 has extended radially outward and now has a diameter that is similar to the diameter of the undriven slug 22 in FIG. 2a. As shown in FIG. 4b, the core 16 of the fastener 10 is driven from both sides of the fastener to permanently secure the fastener. In one preferred embodiment, substantially equal and opposite forces are applied in the direction of Arrows A and B. This creates an upset diameter, d2, at the distal end that is greater than the core diameter, d1. The sleeve 14 is deformed upon being driven. As shown in FIG. 4b, the sleeve 14 preferably is deformed in such a way as to keep core component 12 from contacting any material but the sleeve 14 itself.

Figure 5:
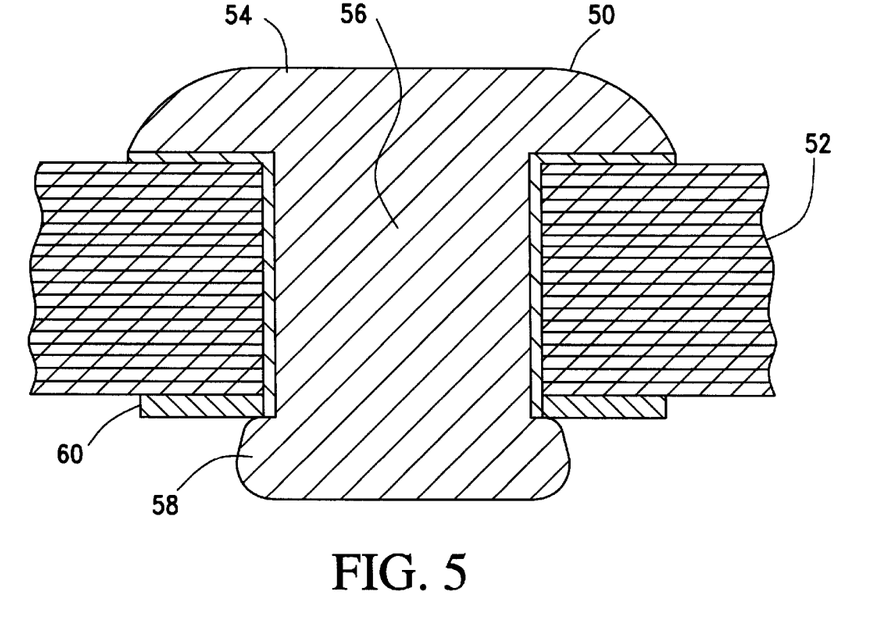
FIG. 5 shows a cross-section of a two-component fastener of the present invention with a washer in place after installation.
Figure 6:
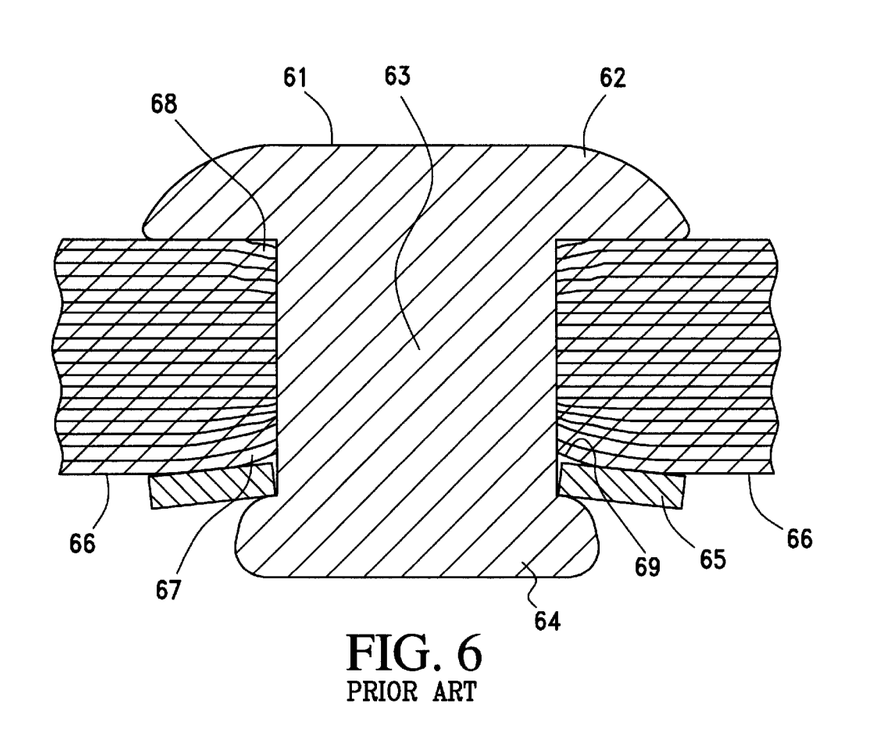
FIG. 6 shows a cross-section of a standard known fastener without a sleeve, but with a washer in position after installation.
Figure 7:
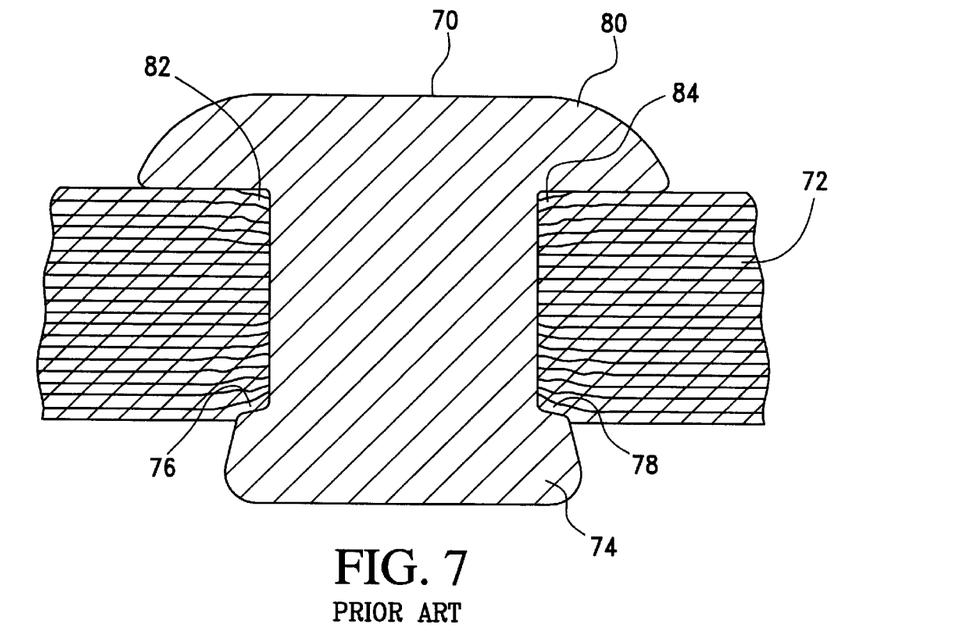
FIG. 7 shows a cross-section of a standard known fastener without either a sleeve or washer in position after installation.

FIGS. 5–7 are comparative figures showing the effect of the sleeved fastener of the present invention (FIG. 5) and sleeveless fasteners (FIGS. 6–7) on the surrounding composite material being fastened, after the installation forces have been applied. Specifically, FIG. 5 shows a sleeved rivet 50, according to the present invention, in position within composite material 52. The rivet 50 has been compressed and has a expanded head portion 54, body portion 56 and expanded end portion 58. An optional washer 60 is in place between end portion 58 and the bottom of composite material 52.

By contrast, FIG. 6 shows a conventional sleeveless rivet 61 that has been compressed and has an expanded head portion 62, body portion 63 and expanded end portion 64. The optional washer 65 is in place between end portion 64 and the bottom of composite material 66. Portions of the composite show signs of damage at the rivet/composite material interface, 67, 68, and 69.

FIG. 7 shows a sleeveless rivet 70 inserted into composite material 72. As in FIGS. 5 and 6, the rivet has been compressed. However, there is no washer in place and damage to the composite material is sustained at the rivet/composite material interface near the rivet end 74 at 76, 78, and near the rivet head 80 at areas 82, 84.

Figure 8:
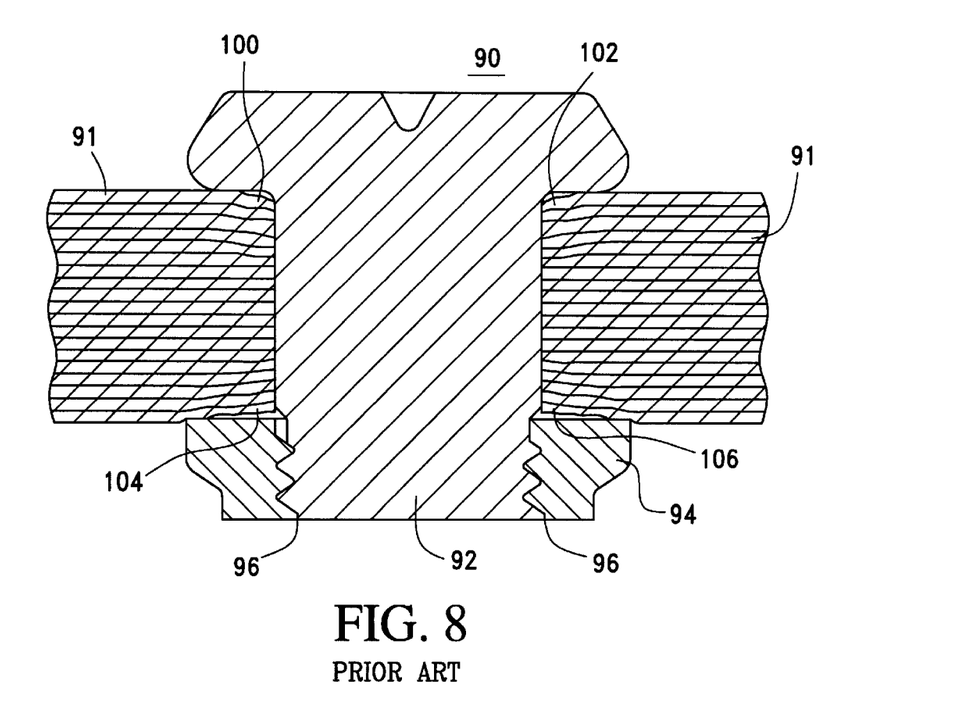
FIG. 8 shows a cross-sectional view of a conventional two-piece non-deformable shank fastener in position after installation.
Figure 9:
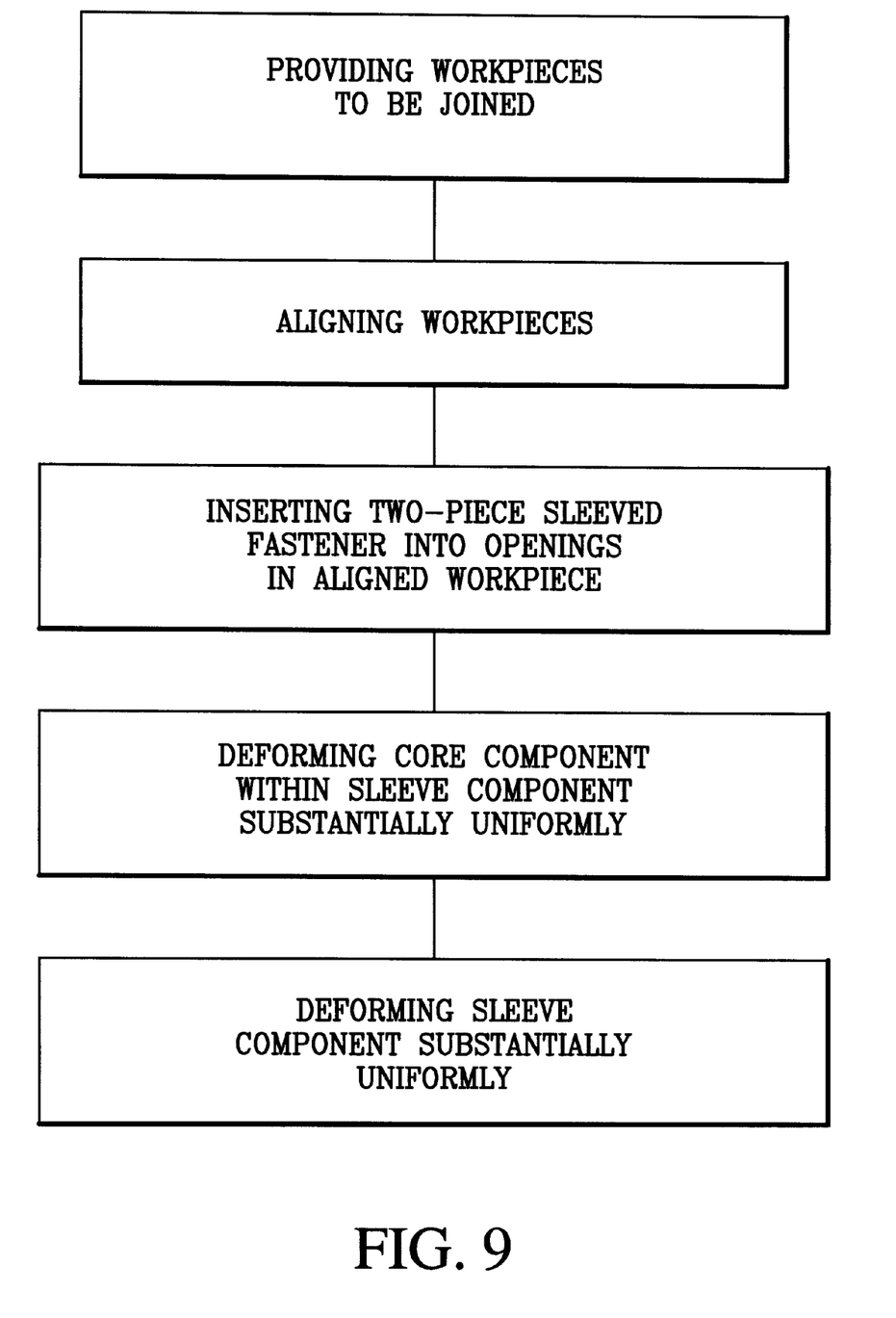
FIG. 9 is a flow chart showing one preferred method of the present invention.

FIG. 8 shows a threaded, two-piece, non-deformable shank fastener 90 conventionally known and routinely used to fasten or join composite material 91. As shown, this fastener comprises a threaded body portion 92 and nut portion 94 with mating threads 96. Damage to the composite material due to uneven and excessive fastener clamp-up can be seen at fastener/composite material interface areas 100, 102, 104, and 106.

The present invention offers the first successful non-damaging expandable shank-type fastener assembly for high performance industries such as the aircraft industry. The use of composites for aircraft structural components is desirable for many reasons including low radar signature, high strength-to-weight ratios, improved durability, and overall improved reliability and performance. However, joining such composite materials together to form a high performance aircraft is difficult. As shown in FIGS. 6–8, the use of conventional fastening technology has yielded less than optimum results. By contrast the sleeved, deformable-shank-type fasteners of the present invention are useful with metallic as well as non-metallic aircraft structural components that ordinarily do not perform well in the composite arena. This is because upon expansion, conventional fasteners, such as rivets, do not deform uniformly and in a controlled fashion in a radially outward direction. Even with two-piece threaded fasteners, joint clamp-up is not controllable and can generate damage to the surrounding composite matrix. This results in uneven, high stress areas on the composite surfaces adjacent the fasteners. Clamp-up refers to either the process or condition of exerting an axial force required to bring two components into intimate contact.

As the fastener is inserted in a substantially cylindrical opening in the composite, such as a clearance-fit type opening, any spaces between the composite wall and the fastener are theoretically taken up by the fastener upon deformation or clamp-up achieved during installation. However, it has been impossible to insure that gaps and spaces between the fastener and the composite structure are not completely eliminated. The elimination of such gaps is critically important to the performance of the end product. Such gaps between the wall of the composite and the installed or deformed fastener can cause gapping or arcing problems. Gapping is defined as the condition whereby areas of the fastener are not in intimate contact with the adjacent surrounding structural components. Consequently, arcing results from the accumulation of charge that occurs due to an electrical imbalance resulting from the resistance created by the gap that exists between the fastener and the adjacent components. The difference in electrical potential between the aluminum fasteners, such as rivets, and the largely refractory composite material, creates significant charge imbalances, for example, during electrical storms. The joints that have gaps present can then explode when the charge buildup reaches a certain level. In such an event, the fasteners must eventually be replaced and the joint repaired. However, until the fastener is replaced, the damaged joint is weakened and can create a condition for stress and material fatigue. The existence of these commonly occurring conditions for aircraft fasteners used in composite aircraft structural joints has eliminated the usefulness of such rivet fastening technology. Therefore, present composite fasteners comprise expensive, heavier and more complicated two-piece fasteners. Such complicated two-piece fasteners are time-consuming and costly to install and maintain. Further, as shown in FIG. 8, the known two-piece threaded fasteners damage the composite material at the fastener/composite material interface.

The previous problems associated with uneven expansion and dissimilar materials causing material stresses and galvanic corrosion are eliminated by the core-in-sleeve fastener of the present invention. Such fasteners dissipate and accommodate any uneven deformation, and provide a barrier between the different component materials.

According to the present invention, the surprising combination of a relatively thin sleeves surrounding and working in concert with the standard fastener, allows today's aircraft industry to use the advantages of a reliable fastening technology (i.e. riveting) to join together primary composite aircraft structural components. The sleeve may be metallic, such as alloys, or other metal containing materials. Most preferably, the rivet core components are made from monel or stainless steel, titanium, commercially pure titanium, titanium alloys, and most preferably 300 series stainless steel.

Fastening is understood to be the process of bringing together two components in a secured, intimate state. Joining is understood to be the process of permanently bringing together two components in an intimate state. The fasteners of the present invention may be used both to join and to fasten at least two components to be brought into intimate contact with one another. For the purpose of this application, the term "fastening" includes "joining".

According to the present invention, the sleeve material and thickness are carefully selected to provide adequate strength and resistance to the fastener but allow for uniform and adequate fastener expansion. This balances, distributes and generally accommodates any radially-outward force irregularities. This improved uniform radially-outward expansion markedly enhances the uniform pressure distribution along the periphery of the sleeve component. Consequently, the sleeve component must have a wall thickness that is adequate to effectively convert an uneven radial force distribution from the rivet into a more uniform force distribution to the composite structural components being joined or fastened. Conversely, the wall thickness of the sleeve component must also be thin enough in a predetermined way to deform radially outward once any non-uniform rivet forces have been corrected.

Prior attempts at sleeved-fastener technologies utilized sleeve wall thicknesses that were too large to resist forces and could not be overcome to deform predictably. See, for example, U.S. Pat. Nos. 4,985,979 and 5,018,920. The materials for each component in the sleeved component fastener of the present invention are therefore selected to produce the desired synergistic effect when known or predetermined installation upset forces normally used for rivet fastening in the aircraft industry are applied. To achieve adequate material flow of the rivet within the cylindrical sleeve component resulting from the compressive forces generated during the rivet installation, it is preferred that the rivet be made from a metal that can sustain deformation without sacrificing material strength. The preferred metals include titanium, titanium alloys, stainless steel, and aluminum alloys. The most preferred aluminum alloys include Series 2000, 5000, and 7000 aluminum alloys, with Series 2117, 2017, and 7050 being most particularly preferred. The most preferred steel alloys are monel and 300 series stainless steel. The most preferred titanium is commercially pure grade titanium.

As mentioned above, in one embodiment, it is the synergistic effect of the selected rivet material and sleeve material that contributes to the success of the present invention. When aluminum-alloy rivets are used, it is preferably contemplated that the sleeve component should be made from monel, 300 series stainless steel, A286 stainless steel, non-magnetic 300 series stainless steel, titanium and titanium alloys, and most preferably have a wall thickness from about 0.005 inch to about 0.020 inch, preferably from about 0.006 inch to about 0.010 inch, and most preferably is about 0.080 inch. Further, optimum radially outward force uniformity due to optimum sleeve expansion deformation uniformity preferably is achieved during standard 0.25 inch diameter rivet installations (an applied installation force of from about 15,000 to about 20,000 lbs.), by using aluminum-alloy rivets made from 2017, 2117, and 7050 series aluminum alloys.

The fasteners of the present invention preferably are pre-coated with a curable organic coating material contained within a stainless steel sleeve having a wall thickness of about 0.008 inch. This enhanced and predictable sleeve expansion deformation uniformity results in a rivet-type fastener able to successfully join or fasten composite materials with no perceptible or consequential damage to the material being fastened.

In the past, sleeved rivet-type fastener arrangements have not worked well either because the sleeve material did not deform sufficiently or uniformly enough to achieve the give necessary fastening, or because the rivet core material within the sleeve was not able to flow uniformly. As a result, there was an insufficient radially-outward force to achieve proper expansion of the sleeve thereby resulting in gapping.

According to the present invention, the substantially cylindrical core component of the fastener is pre-coated with a curable organic coating, preferably a phenolic resin. In an alternate embodiment, the sleeve may also be coated with a similar or different material. In a still further embodiment, the pre-coating of the sleeve may obviate the need to pre-coat the rivet. One preferred coating material is described in commonly assigned U.S. Pat. Nos. 5,614,037, 5,858,133, 5,922,472, and 5,944,918, the entire contents of which are incorporated by reference as if made a part of the specification herein.

The coating material is preferably provided in solution so as to be evenly applied. The usual function of the coating material is to protect the base metal to which it is applied from corrosion, including, for example, conventional electrolytic, galvanic, and stress corrosion. The coating material preferably is a formulation that is primarily of an organic nature, but may also contain additives to improve the properties of the final coating. The coating is desirably dissolved initially in a carrier liquid to facilitate deposition on a substrate. After application, the coating material is curable to effect structural changes within the organic coating material, typically cross-linking of organic molecules to improve the adhesion and cohesion of the coating material to the applied substrate.

Such a curable coating is distinct from a non-curable coating, which has different properties, and is not as suitable for the present corrosion inhibition application of the present invention. Therefore, non-curable coatings such as lacquers are not appropriate for use as coatings in connection with the present invention.

According to one embodiment of the present invention, the fasteners of the present invention are preferably anodized. The anodizing process, preferably in chromic acid, conducted prior to application of the coating serves to promote strong bonding of the organic coating to the aluminum alloy article substrate. The bonding is apparently promoted both by physical mechanical locking and chromate-activated chemical bonding effects. To achieve the physical locking effect, as previously discussed, the anodized surface is not chemically sealed against water intrusion in the anodizing process. The subsequently applied and cured organic coating on the unsealed anodized surface serves to seal the anodized surface.

A number of curable organic coating materials are available and operable in the present process. More specifically, any of a wide variety of curable organic coating materials having polyaromatic resins, such as phenolics, polyimides, polybenoxazoles, etc., preferably mixed with one or more plasticizers, other organic components such as polytetrafluoroethylene, and inorganic additives such as aluminum powder and/or strontium chromate or other corrosion-inhibiting additives. These coating components are preferably dissolved in a suitable solvent present in an amount to produce a desired application consistency. For the coating material just discussed, the solvent is preferably a mixture of ethanol, toluene, and methyl ethyl ketone (MEK). A typical sprayable coating solution preferably has about 30% by weight ethanol, about 7% by weight toluene, about 45% by weight methyl ethyl ketone as the solvent; and about 2% by weight strontium chromate, about 2% by weight aluminum powder, with the balance being phenolic resin and plasticizer. A small amount of polytetrafluoroethylene may optionally be added. Such a product is available commercially under the name, HIKOTE 1™ from Hi-Shear Corp., Torrance, Calif. This product has a standard elevated temperature curing treatment of 1 hour at 400° F.+/−25° F. as recommended by the manufacturer.

The coating may be applied to the untreated fastener core component and/or sleeve using any suitable approach such as dipping, spraying, brushing, or by using a fluidized bed apparatus. In one preferred approach, the solution of coating material dissolved in solvent is sprayed onto the untreated fastener core component. The solvent portion of the coating is removed by drying at either ambient or slightly elevated temperatures. The curing regimen for both the pre-coating and the pre-coated fastener component can be arranged to be coincident according to the protocols listed in U.S. Pat. Nos. 5,614,037; 5,858,133; 5,922,472; and 5,944,918, which are incorporated by reference as if made a part of the specification herein. It is understood that the term "pre-coated" refers to the coating of the fastener or the sleeve component prior to assembly and installation in its final use.

In the alternative, a fully-cured fastener core component may be pre-coated with the preferred coating, which is then cured separately. The coatings of the present invention are internally coherent and are uniformly deposited at a preferred thickness of from about 0.0003 to about 0.0005 inch. It is understood that the coating deposited onto the cylindrical core component of the fastener, and subsequently cured, is able to withstand the installation forces placed upon the core component during upset. The pre-coated fastener core components of the present invention meet required ultimate double shear strength requirements useful in aircraft primary structural applications. Specifically, the fastener core components of the present invention must survive testing for ultimate shear strength requirements ranging from about 41,000 to about 46,000 lbs./in.$^2$ with an ultimate shear strength range of preferably from about 42,500 to about 43,500 lbs./in.$^2$ and have no perceptible impact on the coating integrity even if the protruding heads of the core segments are upset to a diameter of about 1.6 times the initial diameter. In addition, the metals selected for use as fastener sleeve components in the present invention have an ultimate tensile strength of from about 70,000 to about 100,000 lbs./in.$^2$.

Without being restricted to any particular theory, it is believed that the organic coating provided to the outer surface of the core component of the fastener greatly improves the core component's material "flow" capabilities. In this way, upon installation, the deformation of the core component outwardly forces the core component to fill any interstices occurring between the surface of the sleeve and the outer peripheral surface of the core component. In this way, the coating impedes the otherwise natural surface resistance of the inner core component's material relative to the sleeve component's material, and instead allows the coated core component to spread and fill any interstitial gaps or spaces occurring therebetween. This reduction of the natural surface affinity between the sleeve component and the core component increases the uniformity of the radially outward force being exerted on the inner surface of the cylindrical sleeve component. The improved uniform force distribution exerted in a radially outward direction allows the sleeve itself to deform uniformly against the composite material into which the fastener assembly is installed.

As is stated above, the sleeve component itself may or may not also be coated with a similar curable organic coating the same as or different from the curable organic coating used on the core component to improve the installation and further reduce possible corrosion during the useful lifetime of the fastener. It is further understood that the fastening system of the present invention obviates the need for toxic wet sealants to be applied to the composite openings during the fastener installations. The reduction of this step alone is projected to save several millions of dollars in the assembly of each individual aircraft using the fasteners and fastening system of the present invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A two-piece fastener for non-destructively fastening materials, the fastener comprising:
   a substantially cylindrical core component having a diameter and length, said component pre-coated with a curable organic coating; and
   a substantially cylindrical sleeve component having an inner diameter greater than the core segment diameter.

2. A two-piece fastener for non-destructively fastening materials, the fastener comprising:
   a substantially cylindrical core component having a diameter and length, said component pre-coated with a curable organic coating; and
   a substantially cylindrical sleeve component having an inner diameter greater than the core segment diameter, said sleeve component having a wall thickness of from about 0.005 inch to about 0.020 inch.

3. The fastener according to claim 1, wherein the materials being fastened are non-metallic.

4. The fastener according to claim 1, wherein the materials being fastened are metallic.

5. The fastener according to claim 1, wherein the materials being fastened are joined together.

6. The fastener according to claim 1, wherein the fastener fastens both metallic and non-metallic materials.

7. The fastener according to claim 1, wherein the length of the core component exceeds the length of the sleeve component.

8. The fastener according to claim 1, wherein the core component is made from an aluminum alloy.

9. The fastener according to claim 8, wherein the aluminum alloy is selected from the group consisting of series 2000, 5000 and 7000 aluminum alloys.

10. The fastener according to claim 9, wherein the aluminum alloy is selected from the group consisting of series 2017, 2117 and 7050 aluminum alloys.

11. The fastener according to claim 1, wherein the core component has a head segment diameter greater than the core component diameter.

12. The fastener according to claim 1, wherein the sleeve component is made from a metal selected from the group consisting of monel, 300 series stainless steel, A286 stainless steel, non-magnetic 300 series stainless steel, titanium and titanium alloys.

13. The fastener according to claim 12, wherein the sleeve component is made from a material having an ultimate tensile strength of from about 70,000 to about 100,000 lbs./in$^2$.

14. The fastener according to claim 1, wherein the core component is made from a metal having an ultimate shear strength of from about 41,000 to about 46,000lbs./in$^2$.

15. The fastener according to claim 1, wherein the sleeve component is deformable at a force of from about 15,000 to about 20,000 lbs.

16. The fastener according to claim 1, wherein the sleeve component has a wall thickness of from about 0.006 to about 0.010 inch.

17. The fastener according to claim 1, wherein the sleeve component has a wall thickness of about 0.008 inch.

18. The fastener according to claim 1, wherein the core component is a rivet.

19. The fastener according to claim 1, wherein the core component comprises a preformed head.

20. The fastener according to claim 1, wherein the core component comprises a headless slug rivet.

21. The fastener according to claim 1, wherein the core component is pre-coated.

22. The fastener according to claim 1, wherein the sleeve component is pre-coated.

23. The fastener according to claim 1, wherein the coating comprises a curable organic coating.

24. The fastener according to claim 23, wherein the coating comprises polyaromatic resins selected from the group consisting of phenolics, polyimides, polybenoxazoles and mixtures thereof.

25. The fastener according to claim 23, wherein the coating is deposited onto one or more of the fastener components to a thickness of from about 0.0003 inch to about 0.0005 inch.

26. A method for fastening aircraft components comprising the steps of:
providing a plurality of composite sections to be fastened, each section having an opening having a first diameter;
aligning the sections such that the openings align;
inserting a fastener into the opening, the fastener comprising a substantially cylindrical sleeve component having an outer diameter approximately equal to the first diameter of the opening and an inner diameter, and a substantially cylindrical core component having a diameter approximately equal to the inner diameter of the sleeve component, said core component coated with a curable organic coating;
deforming the core component within the sleeve component to cause core material to flow substantially uniformly in a substantially radially-outward direction against the sleeve component; and
deforming the sleeve component substantially uniformly in a substantially radially-outward direction against the composite material.

27. The method according to claim 26, wherein the aircraft components are made from composite materials.

28. The method according to claim 26, wherein the aircraft components are made from non-metallic materials.

29. The method according to claim 26, wherein the aircraft components are made from refractory materials.

30. The method according to claim 26, wherein the aircraft components are made from the group consisting of carbon, graphite and epoxy composite.

31. The method according to claim 26, wherein the step of deforming the core component comprises applying a force to the core component of from about 15,000 lbs. to about 20,000 lbs.

32. The method according to claim 26, wherein the sleeve component is made from a material selected from the group consisting of monel, 300 series stainless steel, A286 stainless steel, non-magnetic 300 series stainless steel, titanium and titanium alloys.

33. The method according to claim 26, wherein the sleeve component has a wall diameter of from about 0.005 inch to about 0.020 inch.

34. The method according to claim 26, wherein the core component is made from a material selected from the group consisting of titanium, titanium alloys, stainless steel and aluminum alloy materials.

35. The method according to claim 25, wherein the core component is made a material selected from the group consisting of series 2000 and series 7000 aluminum alloy materials.

36. The method according to claim 25, wherein the core component has a preformed protruding head configuration.

37. The method according to claim 25, wherein the core component is substantially cylindrical.

38. The method according to claim 25, wherein at least one of the fastener components is coated with a curable organic coating selected from the group consisting of phenolics, polyimides, polybenoxazoles and mixtures thereof.

39. An aircraft component fastened using two-piece fasteners for non-destructively fastening materials, the fasteners comprising:
a substantially cylindrical core component having a diameter and length, said core component having a diameter and length, said core component pre-coated with a curable organic coating; and
a substantially cylindrical sleeve component having an inner diameter greater than the core segment diameter.

40. An aircraft comprising two-piece fasteners for non-destructively fastening materials, the fasteners comprising:
a substantially cylindrical core component having a diameter and length, said core component having a diameter and length, said core component pre-coated with a curable organic coating; and
a substantially cylindrical sleeve component having an inner diameter greater than the core segment diameter.

41. A fastened component comprising two-piece fasteners for non-destructively fastening materials, the fasteners comprising;
a substantially cylindrical core component having a diameter and length, said core component having a diameter and length, said core component pre-coated with a curable organic coating; and
a substantially cylindrical sleeve component having an inner diameter greater than the core segment diameter.

* * * * *

UNITED STATES PATENT AND TRADEMARK OFFICE
CERTIFICATE OF CORRECTION

PATENT NO.     : 6,499,926 B2
DATED          : December 31, 2002
INVENTOR(S)    : Keener It is certified that error appears in the above-identified patent and that said Letters Patent is hereby corrected as shown below:

Title page,
Item [74], "Altson" should read -- Alston --.

Column 10,
Lines 26, 30, 32 and 34 "The method according to claim 25" should read -- The method according to claim 26 --.
Lines 58-59, after "comprising" ";" should be -- : --.

Signed and Sealed this

Fifth Day of August, 2003

JAMES E. ROGAN
*Director of the United States Patent and Trademark Office*